(12) United States Patent
Hansalia

(10) Patent No.: US 11,811,828 B2
(45) Date of Patent: Nov. 7, 2023

(54) ACCESS CONTROL LIST CLONING

(71) Applicant: ARRIS Enterprises LLC, Suwanee, GA (US)

(72) Inventor: Rakesh G. Hansalia, Milpitas, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 194 days.

(21) Appl. No.: 17/352,495

(22) Filed: Jun. 21, 2021

(65) Prior Publication Data

US 2021/0409450 A1 Dec. 30, 2021

Related U.S. Application Data

(60) Provisional application No. 63/045,911, filed on Jun. 30, 2020.

(51) Int. Cl.
*H04L 29/06* (2006.01)
*H04L 9/40* (2022.01)

(52) U.S. Cl.
CPC ............ *H04L 63/20* (2013.01); *H04L 63/101* (2013.01)

(58) Field of Classification Search
CPC ....... H04L 63/20; H04L 63/101; H04L 63/18; H04L 63/104; H04L 63/107; H04L 63/029

USPC ............................................................ 726/3
See application file for complete search history.

(56) References Cited

U.S. PATENT DOCUMENTS

| | | | | |
|---|---|---|---|---|
| 7,171,685 B2 * | 1/2007 | Batra | ................... | H04L 63/0272 726/1 |
| 7,546,629 B2 * | 6/2009 | Albert | ................. | H04L 12/2876 726/13 |
| 8,200,818 B2 * | 6/2012 | Freund | .................. | H04L 63/145 709/224 |

\* cited by examiner

*Primary Examiner* — Longbit Chai
(74) *Attorney, Agent, or Firm* — Steven Stupp; Stewart Wiener

(57) ABSTRACT

A computer may receive editing instructions that specify one or more changes to filters in an existing access control list or a template for an access control list. Then, the computer may dynamically generate the clone access control list by applying the editing instructions to the existing access control list or the template for the access control list. For example, the computer may provide the editing instructions to a computer network device (such as a switch or a router) that are applied to the existing access control list or the template for the access control list while the computer network device is processing data packets. Alternatively, the computer may apply the editing instructions to the existing access control list or the template for the access control list that is not currently installed on the computer network device, and may provide the access control list to the computer network device.

20 Claims, 5 Drawing Sheets

ACCESS CONTROL LIST CLONING

CROSS REFERENCE TO RELATED APPLICATIONS

This application claims priority under 35 U.S.C. 119(e) to: U.S. Provisional Application Ser. No. 63/045,911, "Access Control List Cloning," filed on Jun. 30, 2020, by Rakesh G. Hansalia, the contents of which are herein incorporated by reference.

FIELD

The described embodiments relate to techniques for modifying an access control list for use in a switch or a router by applying editing instructions to an existing access control list or template.

BACKGROUND

Many electronic devices are capable of communicating with other electronic devices. For example, these electronic devices can include a networking subsystem that implements a network interface for: a cellular network (UMTS, LTE, etc.), a wireless local area network or WLAN, e.g., a wireless network such as described in an Institute of Electrical and Electronics Engineers (IEEE) 802.11 standard or Bluetooth from the Bluetooth Special Interest Group of Kirkland, Wash.), and/or another type of wireless network. Alternatively or additionally, the networking subsystem may include a network interface for: an IEEE 802.3 standard (which is sometimes referred to as 'Ethernet') and/or another type of wired or wireless interface.

Wireless networks (such as WLANs) and wired networks often include switches or routers for directing packets or frames to their destinations. An access control list may be used to implement one or more software-level filters for data packets that match one or more associated filtering criteria, such as one or more hardware-level rules that may be applied sequentially or in parallel with each other (such as one or more hardware-level rules that are applied using content-addressable memory). For example, a source address and/or a data address of a data packet that enters a switch or a router may be compared to filtering criteria. When there is a match to the one or more filtering criteria, an action for the data packet may be triggered. Otherwise, the data packet may be dropped.

Typically, a new access control list is generated by manually modifying another access control list. However, this modification process is often labor-intensive and time-consuming, and therefore is usually performed offline.

SUMMARY

A computer is described. This computer may include: an interface circuit that communicates with a computer network device in a network; a processor; and a memory that stores program instructions, where, when executed by the processor, the program instructions cause the computer to perform operations. Notably, during operation, the computer may receive editing instructions that specify one or more changes to filters in an existing access control list or a template for an access control list. Then, the computer dynamically generates a clone access control list by applying the editing instructions to the existing access control list or the template for the access control list.

For example, the computer may provide, from the interface circuit, the editing instructions to the computer network device that are applied to the existing access control list or the template for the access control list while the computer network device is processing data packets. Thus, the computer network device may be dynamically modified while the computer network device is operating.

Alternatively, the computer may dynamically generate the clone access control list by applying the editing instructions to the existing access control list or the template for the access control list that is not currently installed on the computer network device. Next, the computer may provide, from the interface circuit, the access control list to the computer network device.

Note that the computer network device may include a switch or a router.

Moreover, the editing instructions may include a metadata tuple or a configuration file.

Furthermore, the one or more changes may include: a change to a source address, or a change to a destination address (e.g., of a filter).

Additionally, the editing instructions may specify a sequence of filters, where the sequence of filters is a subset of the filters in the existing access control list or the template for an access control list.

In some embodiments, the one or more changes include adding or deleting a filter.

Moreover, the one or more changes may include changing a match or filter criterion for at least one of the filters.

Furthermore, the clone access control list may be dynamically generated based at least in part on: an address in the network associated with a user, a priority of the user in the network, or a privilege of the user in the network. For example, the address may include an Internet Protocol (IP) address.

Another embodiment provides a computer-readable storage medium for use with the computer. When executed by the computer, this computer-readable storage medium causes the computer to perform at least some of the aforementioned operations.

Another embodiment provides a method, which may be performed by the computer. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
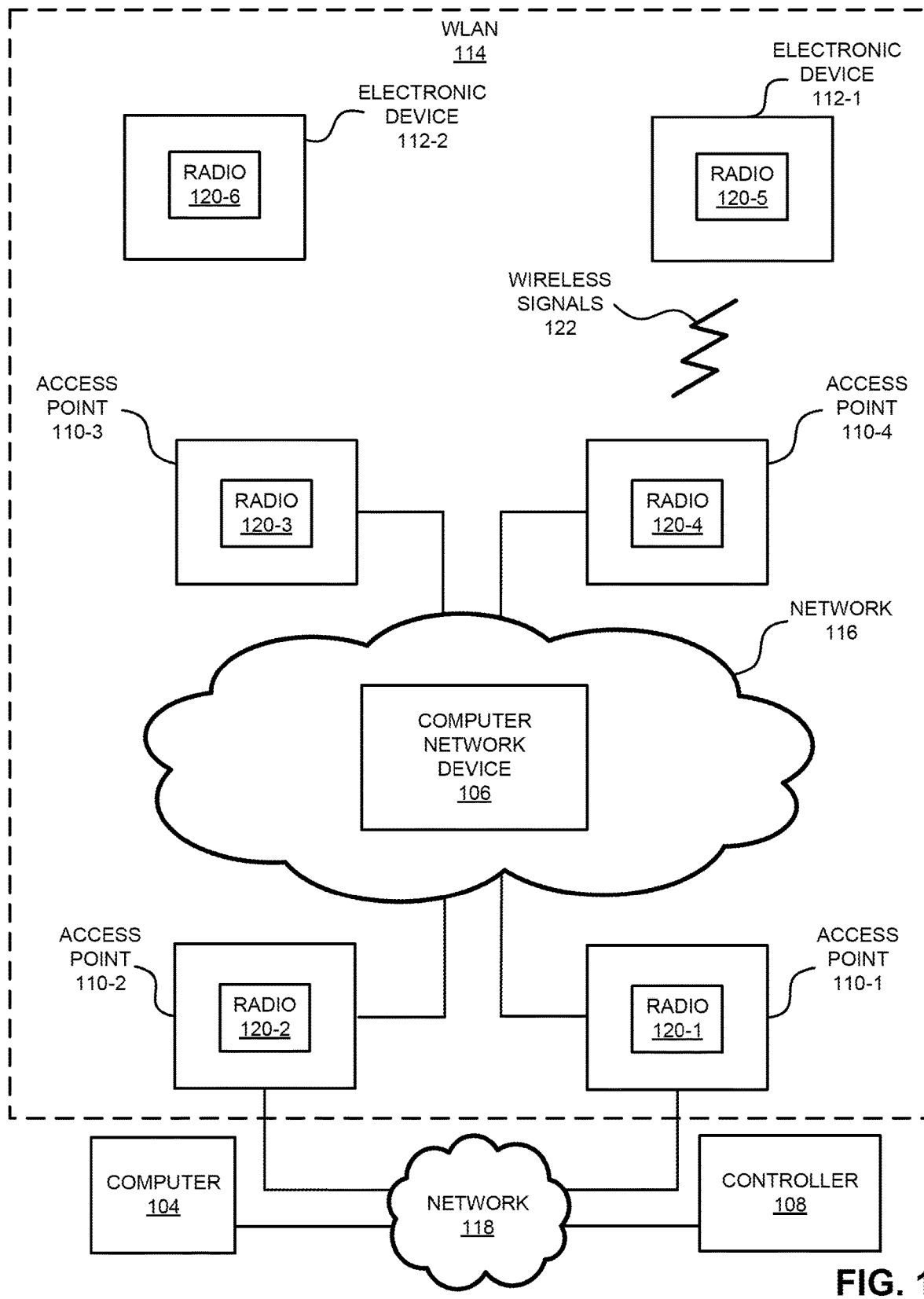
FIG. 1 is a block diagram illustrating an example of communication among access points and electronic devices in a network in accordance with an embodiment of the present disclosure.

A computer that dynamically generates a clone access control list is described. During operation, the computer may access or receive editing instructions that specify one or more changes to filters in an existing access control list or a template for an access control list. Then, the computer may dynamically generate the clone access control list by applying the editing instructions to the existing access control list or the template for the access control list. For example, the computer may provide the editing instructions to a computer network device (such as a switch or a router) that are applied to the existing access control list or the template for the access control list while the computer network device is processing data packets or frames. Alternatively, the computer may dynamically generate the clone access control list by applying the editing instructions to the existing access control list or the template for the access control list that is not currently installed on the computer network device. Next, the computer may provide the access control list to the computer network device.

By dynamically generating the clone access control list, these generating techniques may allow more efficient generating of the clone access control list for use with the computer network device. Moreover, the generating techniques may allow real-time generation of the clone access control list. Thus, the computer network device may be dynamically modified while the computer network device is operating (as opposed to generating the clone access control list offline). Consequently, the generating techniques may reduce the time, effort and cost of generating the clone access control list, which may improve the user experience when using the computer network device.

In the discussion that follows, an access control list engine may be a component in a packet processor that applies an access control list against traffic flowing through a logical port and controls its behavior. An access control list may include a set of filters. Creating a new access control list using a command line interface is typically a cumbersome process because of manual entry of its filters (or filter parameters), especially when the number of filters in the access control list is large. When a newly created access control list has the same characteristics as an existing access control list and is just a modification of the existing access control list with application of some logic, the concept of cloning the new access control list from an existing access control list can significantly reduce the time and effort otherwise involved in entering filters manually. Access-control-list cloning is a technique for generating a new access control list from an existing access control list. The existing access control list from which the new access control list is created is sometimes referred to as 'a template access control list' or 'a base access control list,' and the new access control list is sometimes referred to as 'a clone access control list.' Cloning may use a set of editing instructions in the form of clone metadata tuples, with which the filters of a base access control list are edited to generate the corresponding filters for the new access control list.

Moreover, in the discussion that follows, an access point and/or an electronic device (such as a recipient electronic device, which is sometimes referred to as a 'client') may communicate packets or frames in accordance with a wireless communication protocol, such as an IEEE 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the electronic device and/or the access point may communicate with one or more other access points and/or computers in a network using a wireless or a wired communication protocol, such as an IEEE 802.11 standard, an IEEE 802.3 standard (which is sometimes referred to as 'Ethernet') and/or another type of wired or wireless interface. In the discussion that follows, Ethernet is used as an illustrative example of communication between the electronic device and/or the access point and the one or more other access points and/or computers in the network.

FIG. 1 presents a block diagram illustrating an example of communication among one or more access points 110 and electronic devices 112 (such as a cellular telephone, and which are sometimes referred to as 'clients') in a WLAN 114 (which is used as an example of a network) in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. For example, WLAN 114 may include a computer network device 106, such as a switch or a router.

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication outside of WLAN 114 (such as Ethernet) and wireless communication within WLAN 114 (such as Wi-Fi), and one or more of access points 110 may also support a wired communication protocol for communicating via network 118 with electronic devices (such as a computer 104 or a controller 108 of WLAN 114, which may be remoted located from WLAN 114).

Figure 5:
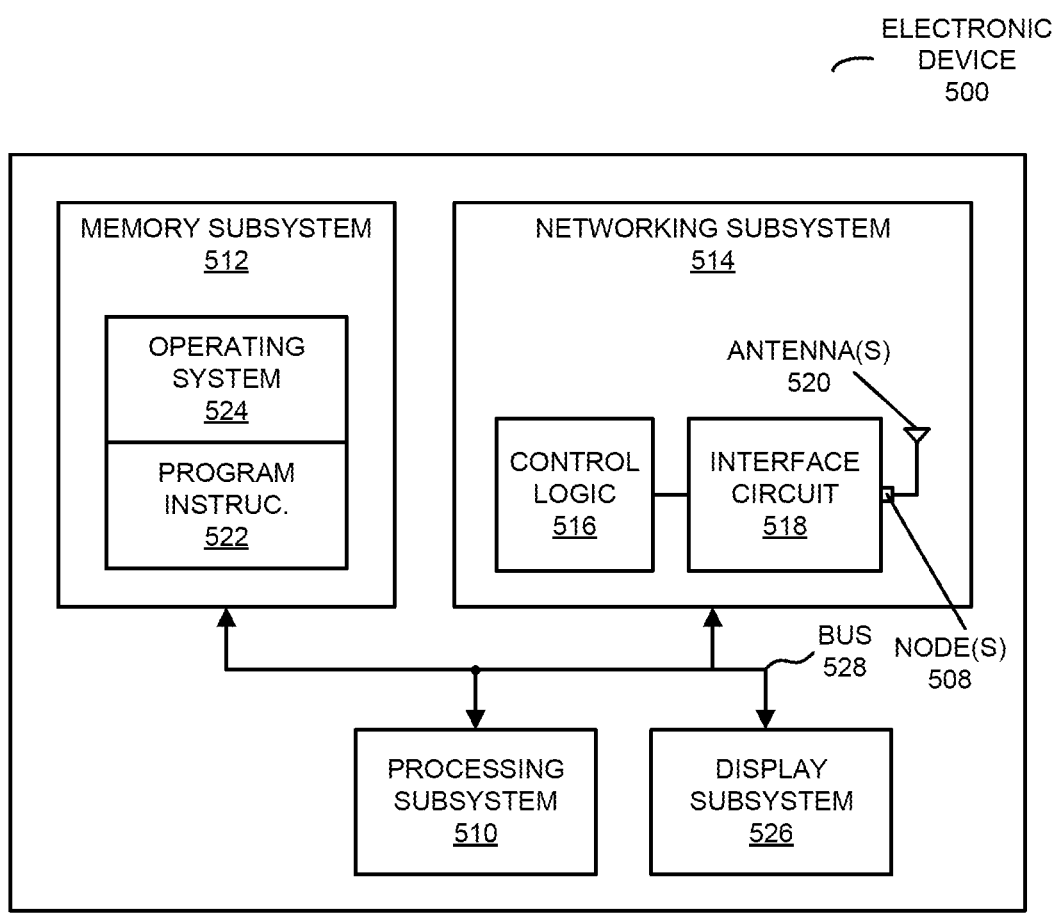
FIG. 5 is a block diagram illustrating an example of an electronic device in accordance with an embodiment of the present disclosure.

As described further below with reference to FIG. 5, computer network device 106, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets or frames. In turn, these packets or frames may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving signals (such as wireless signals 122) corresponding to the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, manually generating an access control list is typically time-consuming and labor-intensive. Consequently, access control lists are usually generated offline, i.e., when a computer network device is not processing data packets or frames.

Figure 2:
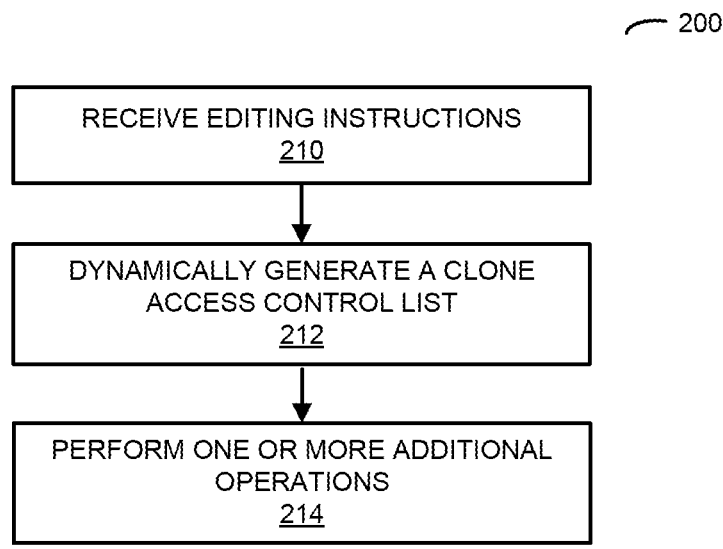
FIG. 2 is a flow diagram illustrating an example of a method for dynamically generating a clone access control list using a computer in FIG. 1 in accordance with an embodiment of the present disclosure.

As described further below with reference to FIGS. 2-4, in order to address these problems, computer 104 may receive or access editing instructions (such as a metadata tuple or a configuration file) that specify one or more changes to filters in an existing access control list or a template for an access control list. For example, a user may use a command line editor to enter the editing instructions, such as via a user interface. Alternatively or additionally, the editing instructions may be received from another electronic device or computer (not shown).

Note that the one or more changes may include: a change to a source address associated with one of the filters, a change to a destination address associated with one of the filters, adding or deleting a filter in the filters, and/or changing a match or filter criterion for at least one of the filters. Moreover, the editing instructions may specify a sequence of filters, where the sequence of filters is a subset of the filters in the existing access control list or the template for an access control list. Furthermore, the clone access control list may be dynamically generated based at least in part on: an address in the network associated with a user, a priority of the user in the network, or a privilege of the user in the network. For example, the address may include an IP address.

Then, computer 104 dynamically generates a clone access control list by applying the editing instructions to the existing access control list or the template for the access control list. For example, computer 104 may provide the editing instructions to computer network device 106. Then, computer network device 106 may apply the editing instructions to the existing access control list or the template for the access control list while computer network device 106 is processing data packets or frames (and, more generally, an arbitrary type of packet, frame or traffic). Thus, computer network device 106 may be dynamically modified while computer network device 106 is operating (as opposed to when computer network device 106 is offline).

Alternatively, computer 104 may dynamically generate the clone access control list by applying the editing instructions to the existing access control list or the template for the access control list that is not currently installed on computer network device 106. Next, computer 104 may provide the access control list to computer network device 106, which may install and use the access control list to process or filter data packets or fames.

In this way, computer 104 may more efficiently generate the clone access control list for use with computer network device 106. This may reduce the time, effort and cost of generating the clone access control list. Moreover, the increased flexibility may allow computer network device 106 to be adapted to changes in the environment or the network. Consequently, the generating techniques may improve the communication performance in the network, which may improve the user experience when using computer network device 106.

We now describe embodiments of a method. FIG. 2 presents a flow diagram illustrating an example of a method 200 for dynamically generating a clone access control list in accordance with some embodiments. This method may be performed by a computer (such as computer 104 in FIG. 1).

During operation, the computer may receive editing instructions (operation 210) that specify one or more changes to filters in an existing access control list or a template for an access control list. For example, the editing instructions may include a metadata tuple or a configuration file.

Then, the computer may dynamically generate a clone access control list (operation 212) by applying the editing instructions to the existing access control list or the template for the access control list. For example, the computer may provide the editing instructions to a computer network device (such as a switch or a router) in a network, which may apply the editing instructions to the existing access control list or the template for the access control list while the computer network device is processing data packets. Thus, the computer network device may be dynamically modified while the computer network device is operating.

Note that the one or more changes may include: a change to a source address associated with one of the filters, a change to a destination address associated with one of the filters, adding or deleting a filter in the filters, and/or changing a match or filter criterion for at least one of the filters. Moreover, the editing instructions may specify a sequence of filters, where the sequence of filters is a subset of the filters in the existing access control list or the template for an access control list. Furthermore, the clone access control list may be dynamically generated based at least in part on: an address in the network associated with a user, a priority of the user in the network, or a privilege of the user in the network. For example, the address may include an IP address.

In some embodiments, the computer may optionally perform one or more additional operations (operation 214). For example, alternatively or in addition to operation 212, the computer may dynamically generate the clone access control list by applying the editing instructions to the existing access control list or the template for the access control list that is not currently installed on the computer network device. Next, the computer may provide the access control list to the computer network device, which may install and use the access control list to process or filter data packets or frames.

In some embodiments of method 200, there may be additional or fewer operations. Furthermore, the order of the operations may be changed, and/or two or more operations may be combined into a single operation.

Figure 3:
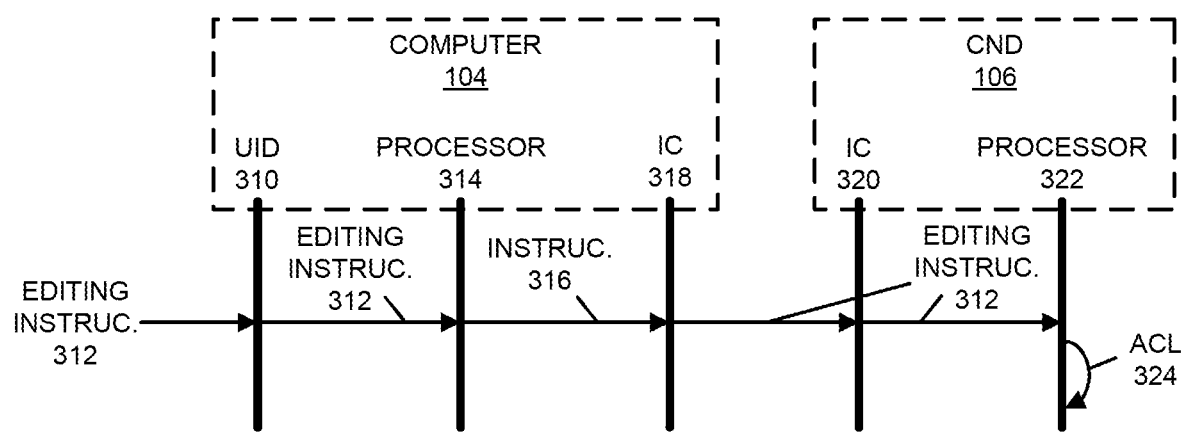
FIG. 3 is a drawing illustrating an example of communication among electronic devices in FIG. 1 in accordance with an embodiment of the present disclosure.

FIG. 3 presents a drawing illustrating an example of communication among computer 104 and computer network device 106 in accordance with some embodiments. Notably, a user-interface device (UID) 310 (such as a touch-sensitive display, a mouse, a keyboard, a touchpad, a stylus, etc.) in computer 104 may receive editing instructions 312 that specify one or more changes to filters in an existing access control list or a template for an access control list. In response, user-interface device 310 may provide editing instructions 312 to processor 314 in computer 104.

Then, processor 314 may instruct 316 interface circuit (IC) 318 in computer 104 to provide editing instructions 312 to computer network device (CND) 106. After receiving editing instructions 312, an interface circuit 320 in computer network device 106 may provide editing instructions 312 to processor 322 in computer network device 106. Next, processor 322 may apply editing instructions 312 to an existing access control list or a template for the access control list to dynamically generate access control list (ACL) 324. This access control list may be used by computer network device 106 to process or filter data packets or frames.

While FIG. 3 illustrates communication between components using unidirectional or bidirectional communication with lines having single arrows or double arrows, in general the communication in a given operation in these figures may involve unidirectional or bidirectional communication.

Figure 4:
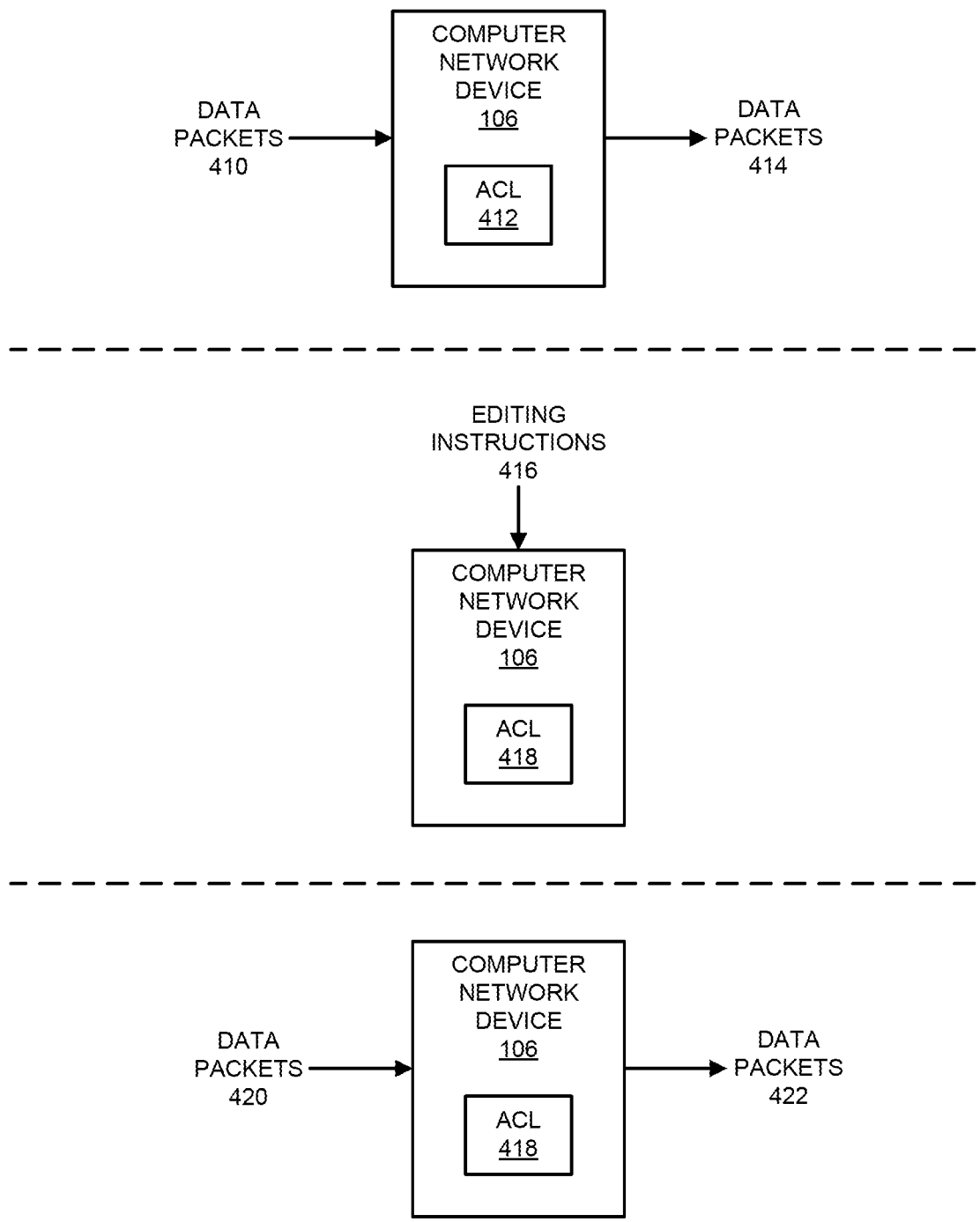
FIG. 4 is a drawing illustrating a technique for dynamically generating a clone access control list in accordance with an embodiment of the present disclosure.

FIG. 4 is a drawing illustrating a technique for dynamically generating a clone access control list in accordance with an embodiment of the present disclosure. Notably, computer network device 106 may process or filter data packets 410 or frames using filters in access control list 412. For example, data packets 414 (which include a subset of data packets 410 or modified data packets based at least in part on filter match and one or more action criteria) may be output from computer network device 106.

When computer network device 106 receives editing instructions 416, computer network device 106 may dynamically generate access control list 418 by applying editing instructions 416 to access control list 412. Then, computer network device 106 may process or filter data packets 420 or frames using filters in access control list 418. For example, data packets 422 (which include a subset of data packets 420) may be output from computer network device 106.

In some embodiments, a template access control list may include: IP access-list template access control list {permit source any destination any transmission control protocol (TCP), deny source any destination any user datagram protocol (UDP)}. During the cloning, the source IP address in the filters in the original template access control list may be modified. The resulting access control list may include: IP access-list clone access control list {permit source 10.10.10.10 destination any TCP, deny source 10.10.10.10 destination any UDP}.

The name of the template access control list and the set of editing instructions applied to the template access control list may, together, be referred to as 'a clone definition.' Moreover, the editing instructions may be referred to as 'clone metadata.' Each editing instruction in the set may be referred to as 'a metadata tuple.' Thus, the data included in the clone definition may include: a template or base access control list name; and metadata, including an array/list of metadata tuples.

A metadata tuple may manipulate the filters of a template access control list to derive the filter set of the clone access control list. Moreover, a metadata tuple may include an operation instruction that applies to a specific filter identified by the sequence number or to a logical set of filters identified by a logical operation. For example, in the preceding example, the operation is 'replace source IP' and the data is ' 10.10.10.10.' Note that the (operation, data) tuple is referred to as the 'metadata tuple.' Thus, in the preceding example, the editing instructions includes: create clone request {base access control list: template access control list, metadata {tuple (clone operation: merge-source-IP, data: 10.10.10.10)}}.

In some embodiments, a metadata tuple may: add a filter at a sequence number; delete a filter at a sequence number; modify a filter by replacing an existing qualifier with another qualifier, add a new action qualifier, and/or delete an existing buffer may be edited against all metadata tuples in the specified sequence, starting, e.g., with the first metadata tuple. Note that a given metadata tuple may be applied based on the operation and the one or more specified filter-matching criteria to filters in the clone buffer in the sequential order. This may result in addition, deletion and/or modification of the one or more filters in the clone buffer. After the last metadata tuple edit, the remaining filters in the clone buffer may constitute the clone access control list.

Moreover, the data contained in a clone metadata tuple may include: a sequence number (or an identifier of a filter), operation code, and operation data. Table 1 presents an example of pseudocode for a C data structure for the clone metadata tuple in some embodiments.

TABLE 1

```
typedef struct {
    UINT32                         sequence_num;
    aclinfra_clone_op_code_e       oper;
    aclinfra_clone_op_data_t       data;
} aclinfra_clone_metadata_tuple_t;
where, aclinfra_clone_op_code_e is defined as:
typedef enum {
    e_ACLINFRA_CLONE_OPER_ADD_FILTER    = 1,
    e_ACLINFRA_CLONE_OPER_DEL_FILTER    = 2,
    e_ACLINFRA_CLONE_OPER_MERGE_IP      = 3,
    e_ACLINFRA_CLONE_OPER_ADD_ACTION    = 4,
    e_ACLINFRA_CLONE_OPER_DEL_ACTION    = 5,
} aclinfra_clone_op_code_e;
where, aclinfra_clone_op_data_t provides the filter match qualifier involved in
a specific clone operation, such as source IP address, destination IP address, etc.
For example, for the clone operation e_ACLINFRA_CLONE_OPER_MERGE_IP,
aclinfra_clone_op_data_t provides the source IP address, destination IP address
to match against the filters in the base access control list. Similarly,
aclinfra_clone_op_data_t provides the actions to be added for the
e_ACLINFRA_CLONE_OPER_ADD_ACTION operation.
``` action qualifier; and/or merge one or more IP addresses and generate a new set of filters, such as merge a source IP address and/or merge a destination IP address.

Moreover, clone metadata can have multiple tuples. Notably, a client can also specify multiple tuples of metadata when requesting to create a clone access control list. The ability to support multiple tuples in metadata may be helpful for access-control-list clients (or computer network devices) that need to create several instances of the rules from the template access control list, but still want to limit the number of clone access control lists. For example, an access-control-list client may want to instance the rules from a template access control list for every IP address learned from dynamic host control protocol (DHCP) snooping, and these IP addresses may potentially be in several hundred per logical interface.

Therefore, in another example, a template access control list may include: IP access-list template access control list {permit source any destination any TCP, deny source any destination any UDP}. Moreover, the editing instructions may include: create clone request {base access control list: template access control list, metadata {tuple 1 (clone operation: merge-source-IP, data: 10.10.10.10) tuple 2 (clone operation: merge-source-IP, data: 20.20.20.20)}}. The resulting access control list may include: IP access-list clone access control list {permit source 10.10.10.10 destination any TCP, deny source 10.10.10.10 destination any UDP, permit source 20.20.20.20 destination any TCP, deny source 20.20.20.20 destination any UDP}.

During the cloning process, a template access control list may be opened for editing in a clone buffer. Then, the clone Note that all of the filters from the template access control list may be included in the clone access control list. Notably, in the preceding examples, each metadata tuple resulted in the addition of another instance of all filters from the template access control list. However, in general, not all kinds of clone operations will result in picking every filter.

For example, a merge-IP operation may result in picking a filter only if the merge operation results in a match. In an example of a merge-IP clone operation, a template access control list may include: IP access-list template access control list {10 permit IP 2.2.2.0 0.0.0.255 any, 20 deny IP host 2.2.2.2 3.3.3.0 0.0.0.255, 30 permit IP any host 3.3.3.3, 40 deny IP 4.4.4.4 any}. Moreover, the editing instructions may include: create clone request {base access control list: template access control list, metadata {tuple 1 (clone operation: merge-source-IP, data: 2.2.2.1)}}. The resulting access control list may include: IP access-list clone access control list {10 permit IP host 2.2.2.1 any, 30 permit IP host 2.2.2.1 host 3.3.3.3}.

A clone access control list may have one or more of the following characteristics. Notably, a clone access control list may be created when: a clone definition exists; and/or a template access control list exists. When a clone definition is created with an empty tuple, an empty clone access control list may be created with no filters. Moreover, when a clone definition with non-empty tuples is created, but the base access control list does not exist yet, then no clone access control list may be created yet. Furthermore, a set of filters may be dynamically added to the corresponding clone access control list whenever a tuple is added to the clone definition. Additionally, a set of filters may be dynamically deleted from the corresponding clone access control list when a tuple is deleted from the clone definition.

In some embodiments, a clone definition may be modified. Notably, in a clone definition, one or more new metadata tuples may be added, or the existing tuples may be deleted or modified. For example, an access-control-list client may add a new tuple when a new IP address is learned from DHCP snooping. Similarly, when an existing IP address in a DHCP snooping database expires, the access-control-list client may want to remove the tuple corresponding to that IP address alone, leaving the rest of the tuples intact. When such a change occurs in the clone definition, it may constitute a corresponding change in the clone access control lists created from this clone definition. Moreover, where the pure modification of a metadata tuple is not possible, the existing metadata tuple may be replaced with a new metadata tuple by deleting the existing one and adding a new one with the same sequence number. Furthermore, an existing metadata tuple may be deleted by specifying the sequence number.

Note that, from a hardware programming point of view, when the modifications are performed, if the clone access control list is currently bound to one or more logical interfaces in a computer network device, the new filters that are included in the clone access control list get programmed on each of these logical interfaces, and similarly the filters that were deleted from the clone access control list are de-programmed from the respective logical interfaces. As an example, a modify clone operation may include: modify clone request {base access control list: template access control list, metadata {tuple operation: delete, tuple 1 (clone operation: merge-source-IP, data: 10.10.10.10), tuple operation: add, tuple 3 (clone operation: merge-source-IP, data: 30.30.30.30)}}.

In some embodiments, a user may modify a template access control list from which one or more clone access control lists are created. When such a modification occurs in a template access control list, it may trigger that all clone access control lists cloned out of this template access control list may need to be modified by reapplying the clone metadata to the modified filters in the template access control list, thereby also modifying the corresponding filters in the clone access control list(s).

We now describe embodiments of an electronic device, which may perform at least some of the operations in the generating techniques. FIG. 5 presents a block diagram illustrating an example of an electronic device 500 in accordance with some embodiments, such as one of computer 104, computer network device 106, controller 108, one of access points 110 or one of electronic devices 112. This electronic device includes processing subsystem 510, memory subsystem 512, and networking subsystem 514. Processing subsystem 510 includes one or more devices configured to perform computational operations. For example, processing subsystem 510 can include one or more microprocessors, ASICs, microcontrollers, programmable-logic devices, one or more graphics process units (GPUs) and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program instructions 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as nodes 508, e.g., a network node that can be coupled or connected to a network or link, or an antenna node, connector or a metal pad that can be coupled to the one or more antennas 520. Thus, electronic device 500 may or may not include the one or more antennas 520.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a stack of computer network devices, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program instructions 522 are included in operating system 524 and/or control logic 516 is included in interface circuit 518. In some embodiments, the generating techniques are implemented using information in layer 2 and/or layer 3 of the OSI model.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of electronic device 500 and/or networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the generating techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the generating techniques may be implemented using program instructions 522, operating system 524 (such as a driver for interface circuit 518) or in firmware in interface circuit 518. Alternatively or additionally, at least some of the operations in the generating techniques (such as one of the filters in an access control list) may be implemented in a physical layer, such as hardware in interface circuit 518.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the generating techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system for access control cloning, comprising:
    an interface circuit configured to communicate with a computer network device in a network;
    a processor; and
    memory configured to store program instructions, wherein, when executed by the processor, the program instructions cause the computer system to perform operations comprising:
        receiving editing instructions that specify one or more changes to filters in an existing access control list or a template for an access control list; and
        dynamically generating a clone access control list by applying the editing instructions to the existing access control list or the template for the access control list, wherein the editing instructions are configured to be applied to the existing access control list or the template for the access control list while the computer network device is processing data packets;
        wherein the clone access control list comprises the filters for data packets that match associated filtering criteria;
        wherein the editing instructions comprise one or more metadata tuples and a given metadata tuple in the metadata tuples comprises: an identifier of a given filter in the one or more filters, operation code, and operation data and the metadata tuple specifies manipulations to the filters of the existing access control list or the template control list to derive a filter set of the clone access control list; and
        wherein dynamically generating the clone access control list comprises opening the existing access control list or the template for the access control list in a clone buffer and applying the editing instructions to the existing access control list or the template for the access control list.

2. The computer system of claim 1, wherein the dynamic generating comprises providing, from the interface circuit, the editing instructions addressed to the computer network device.

3. The computer system of claim 1, wherein the editing instructions comprise a configuration file.

4. The computer system of claim 1, wherein the one or more changes comprise: a change to a source address, or a change to a destination address associated with a filter.

5. The computer system of claim 1, wherein the editing instructions specify a sequence of filters; and
    wherein the sequence of filters is a subset of the filters in the existing access control list or the template for an access control list.

6. The computer system of claim 1, wherein the one or more changes comprise adding or deleting a filter.

7. The computer system of claim 1, wherein the one or more changes comprise changing a match or filter criterion for at least one of the filters.

8. The computer system of claim 1, wherein the clone access control list is dynamically generated based at least in part on: an address in the network associated with a user, a priority of the user in the network, or a privilege of the user in the network.

9. The computer system of claim 8, wherein the address comprises an Internet Protocol (IP) address.

10. A non-transitory computer-readable storage medium for use in conjunction with a computer system, the computer-readable storage medium storing program instructions that, when executed by the computer system, causes the computer system to perform operations comprising:
    receiving editing instructions that specify one or more changes to filters in an existing access control list or a template for an access control list; and
    dynamically generating a clone access control list by applying the editing instructions to the existing access control list or the template for the access control list, wherein the editing instructions are configured to be applied to the existing access control list or the template for the access control list while the computer network device is processing data packets;
    wherein the clone access control list comprises the filters for data packets that match associated filtering criteria;
    wherein the editing instructions comprise one or more metadata tuples and a given metadata tuple in the metadata tuples comprises: an identifier of a given filter in the one or more filters, operation code, and operation data and the metadata tuple specifies manipulations to the filters of the existing access control list or the template control list to derive a filter set of the clone access control list; and
    wherein dynamically generating the clone access control list comprises opening the existing access control list or the template for the access control list in a clone buffer and applying the editing instructions to the existing access control list or the template for the access control list.

11. The non-transitory computer-readable storage medium of claim 10, wherein the dynamic generating comprises providing, from the interface circuit, the editing instructions addressed to the computer network device.

12. The non-transitory computer-readable storage medium of claim 10, wherein the editing instructions comprise a configuration file.

13. The non-transitory computer-readable storage medium of claim 10, wherein the one or more changes comprise: a change to a source address, or a change to a destination address associated with a filter.

14. The non-transitory computer-readable storage medium of claim 10, wherein the editing instructions specify a sequence of filters; and wherein the sequence of filters is a subset of the filters in the existing access control list or the template for an access control list.

15. The non-transitory computer-readable storage medium of claim 10, wherein the one or more changes comprise adding or deleting a filter.

16. The non-transitory computer-readable storage medium of claim 10, wherein the one or more changes comprise changing a match or filter criterion for at least one of the filters.

17. The non-transitory computer-readable storage medium of claim 10, wherein the clone access control list is dynamically generated based at least in part on: an address in the network associated with a user, a priority of the user in the network, or a privilege of the user in the network.

18. A method for dynamically generating a clone access control list, comprising:

by a computer system:

receiving editing instructions that specify one or more changes to filters in an existing access control list or a template for an access control list; and dynamically generating the clone access control list by applying the editing instructions to the existing access control list or the template for the access control list, wherein the editing instructions are configured to be applied to the existing access control list or the template for the access control list while the computer network device is processing data packets;

wherein the clone access control list comprises the filters for data packets that match associated filtering criteria;

wherein the editing instructions comprise one or more metadata tuples and a given metadata tuple in the metadata tuples comprises: an identifier of a given filter in the one or more filters, operation code, and operation data and the metadata tuple specifies manipulations to the filters of the existing access control list or the template control list to derive a filter set of the clone access control list; and wherein dynamically generating the clone access control list comprises opening the existing access control list or the template for the access control list in a clone buffer and applying the editing instructions to the existing access control list or the template for the access control list.

19. The method of claim 18, wherein the dynamic generating comprises providing, from the interface circuit, the editing instructions addressed to the computer network device.

20. The method of claim 18, wherein the one or more changes comprise: a change to a source address, a change to a destination address associated with a filter, adding or deleting a filter, or changing a match or filter criterion for at least one of the filters.

* * * * *